United States Patent [19]
Sakoda

[11] Patent Number: 5,542,524
[45] Date of Patent: Aug. 6, 1996

[54] SEPARATOR/FEEDER FOR HEADED FASTENERS

[75] Inventor: K. Sakoda, Toyohashi, Japan

[73] Assignee: Emhart Inc., Newark, Del.

[21] Appl. No.: 307,955

[22] Filed: Sep. 16, 1994

[30] Foreign Application Priority Data

Sep. 16, 1993 [JP] Japan ................... 5-050304 U

[51] Int. Cl.$^6$ ................................. B65G 47/24
[52] U.S. Cl. ..................... 198/409; 198/468.11
[58] Field of Search ................ 198/468.9, 468.11, 198/408, 409

[56] References Cited

U.S. PATENT DOCUMENTS

| | | | |
|---|---|---|---|
| 3,367,015 | 2/1969 | Brosene, Jr. | 198/389 X |
| 4,128,174 | 12/1978 | Frisbie et al. | 198/408 X |
| 4,744,455 | 5/1988 | Dragotta et al. | 198/389 |
| 5,201,892 | 4/1993 | Salter | 198/468.11 X |

Primary Examiner—D. Glenn Dayoan
Attorney, Agent, or Firm—Edward D. Murphy

[57] ABSTRACT

A separator/feeder 16 in which a chute 18 stores a plurality of headed fasteners 4 in line and feeds them one by one to a shuttle 20 having a storage cavity. A piston-cylinder device 24 reciprocates the shuttle between a first position in which the headed fasteners are singly received in the storage cavity and a second position in which they are conveyed, shanks foremost, to a discharge port and hence a discharge tube 25 connected thereto. A rotatable disk 27 provided in the housing 22 transmits the headed fasteners into an upside-down position in the storage cavity of the slidable shuttle. A rack 32 and a pinion 30 function to link the rotation of the disk with the reciprocating movement of the shuttle so that the headed fasteners can be received from a pocket 28 in the disk when the storage cavity of the shuttle is in the first position and can be received from the chute 18 into the disk pocket when the storage cavity of the shuttle is in the second position. The discharge port for fastener 23 faces toward the top surface of the housing, and the discharge tube 25 for feeding the fasteners extends beyond the top surface of the housing.

3 Claims, 7 Drawing Sheets

5,542,524

SEPARATOR/FEEDER FOR HEADED FASTENERS

BACKGROUND OF THE INVENTION

The present invention relates to a headed fastener separator/feeder for separating headed fasteners in a row from a chute and feeding them one by one.

A known headed fastener separator/feeder is described with reference to FIGS. 1 through 3 in which a separator/feeder 1 for T-studs uses a chute 2 that stores a plurality of T-studs 4 standing in a row so that their shanks are received in a groove 3 with the heads positioned above the groove to thereby send them toward an outlet. The feeder/separator 1 is provided with a shuttle 7 having a storage cavity 6 (See FIGS. 2 and 3.) to receive a single T stud 4 from the chute 2. The shuttle 7 is supported by a body or housing 8 in such a manner that the shuttle is reciprocated. The body 8 is connected with an outlet from the chute 2 to receive T-studs 4. On the body 8, a piston-cylinder device 11 is mounted to reciprocate the shuttle 7 between a first position in the housing in which the storage cavity 6 receives a T-stud 4 from the chute 2 (See FIG. 2) and a second position in the housing in which the storage cavity 6 is positioned at a discharge port 9 for T-studs 4. A piston rod 12 of the piston-cylinder device 11 is connected to the shuttle 7 to reciprocate the shuttle 7 between the first position of FIG. 2 and the second position of FIG. 3. To the discharge port 9 of the housing 8, a discharge tube 13 is connected to convey the T-studs 4 to a stud welder or the like with their shanks being foremost in the direction of travel. For feeding the T-studs, the top surface of the body opposite to the discharge port 9 is provided with an air pipe 14 to supply pressurized air. When the separator/feeder 1 as described above is at the first position of FIG. 2, a single T-stud 4 is stored in the storage cavity 6 of the shuttle 7. The shuttle 7 is then moved to the second position of FIG. 3 by the piston-cylinder device 11, and the T-stud 4 is fed into the discharge tube 13 with its shank being foremost. Thus, the T-studs 4 are fed one by one to a stud welder or the like by reciprocating the shuttle 7.

The known separator/feeder described above separates the headed fasteners one by one by reciprocating the shuttle so that the shank of the fastener is always foremost. Since this arrangement is suitable for automatic feeding to a stud welder, or a pneumatic screw driver or the like, such separator/feeders are widely in use. Moreover, in this known device, the headed fasteners are fed through the tube extending from the lower portion of the separator/feeder body or housing. Thus, in an already limited space below the housing, a further space is required for changing the direction of the discharge tube. As shown in FIG. 1, a space having a height H has to be provided under the body for accommodating the tube. Because the tube is in a restricted space it can only be manipulated in a limited direction.

OBJECTS AND SUMMARY OF THE INVENTION

The principle object and purpose of the present invention is to provide a headed fastener separator/feeder in which the discharge tube can be easily manipulated in any direction.

It is another object of the present invention to provide a separator/feeder for headed fasteners which can be rotated from one orientation to an opposite orientation before being discharged for use.

According to one embodiment of the present invention there is provided a separator/feeder for headed fasteners comprising a chute for receiving a plurality of headed fasteners arranged in a line with their shanks received in a groove and their heads being above the groove for feeding the fasteners toward an outlet, a shuttle having a storage cavity to receive a single headed fastener, a body or housing for reciprocatingly supporting the shuttle and supporting the chute to receive the headed fasteners, means attached to the housing for reciprocating the shuttle between a first position in the body in which the storage cavity receives a headed fastener from the chute and a second position in the housing in which the storage cavity is positioned at a discharge port for the headed fastener, and a discharge tube attached to the discharge port for conveying the headed fasteners with the shanks foremost. A rotatable disk with a pocket on its periphery is positioned in the housing to pass by the outlet of the chute, such that the rotation of the disk is associated with reciprocating movement of the shuttle so that the storage cavity of the shuttle receives the headed fastener from the pocket of the disc when the storage cavity is at the first position, and the disk receives a headed fastener from the chute into the pocket thereof when the storage cavity is in the second position, and further the fastener discharge port of the body is directed toward the top surface of the body or housing.

The invention will be better understood and further objects and advantages thereof will become more apparent from the ensuing detailed description of the preferred embodiments taken in conjunction with the drawings.

DETAILED DESCRIPTION OF THE PREFERRED EMBODIMENT

Figure 2:
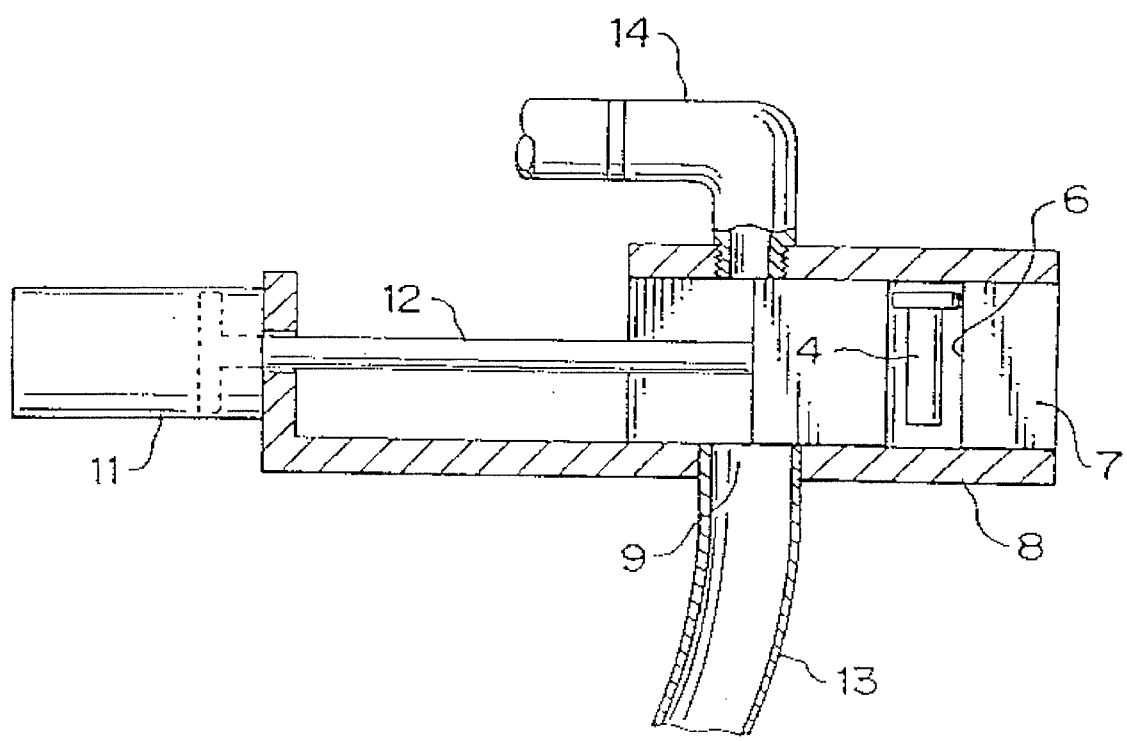
FIG. 2 is a schematic view in partial cross-section of a shuttle of the separator/feeder of FIG. 1 in a first position.
Figure 3:
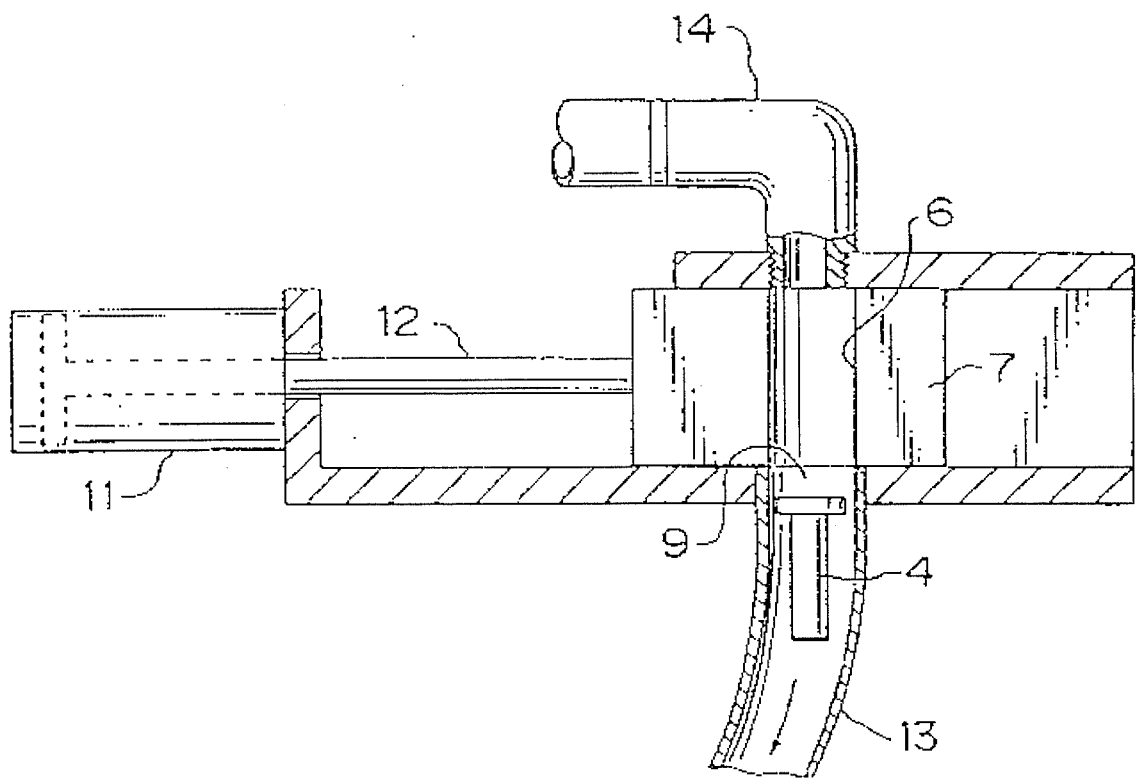
FIG. 3 is a schematic view in the partial cross-section of the shuttle of the separator/feeder of FIG. 1 in a second position.
Figure 4:
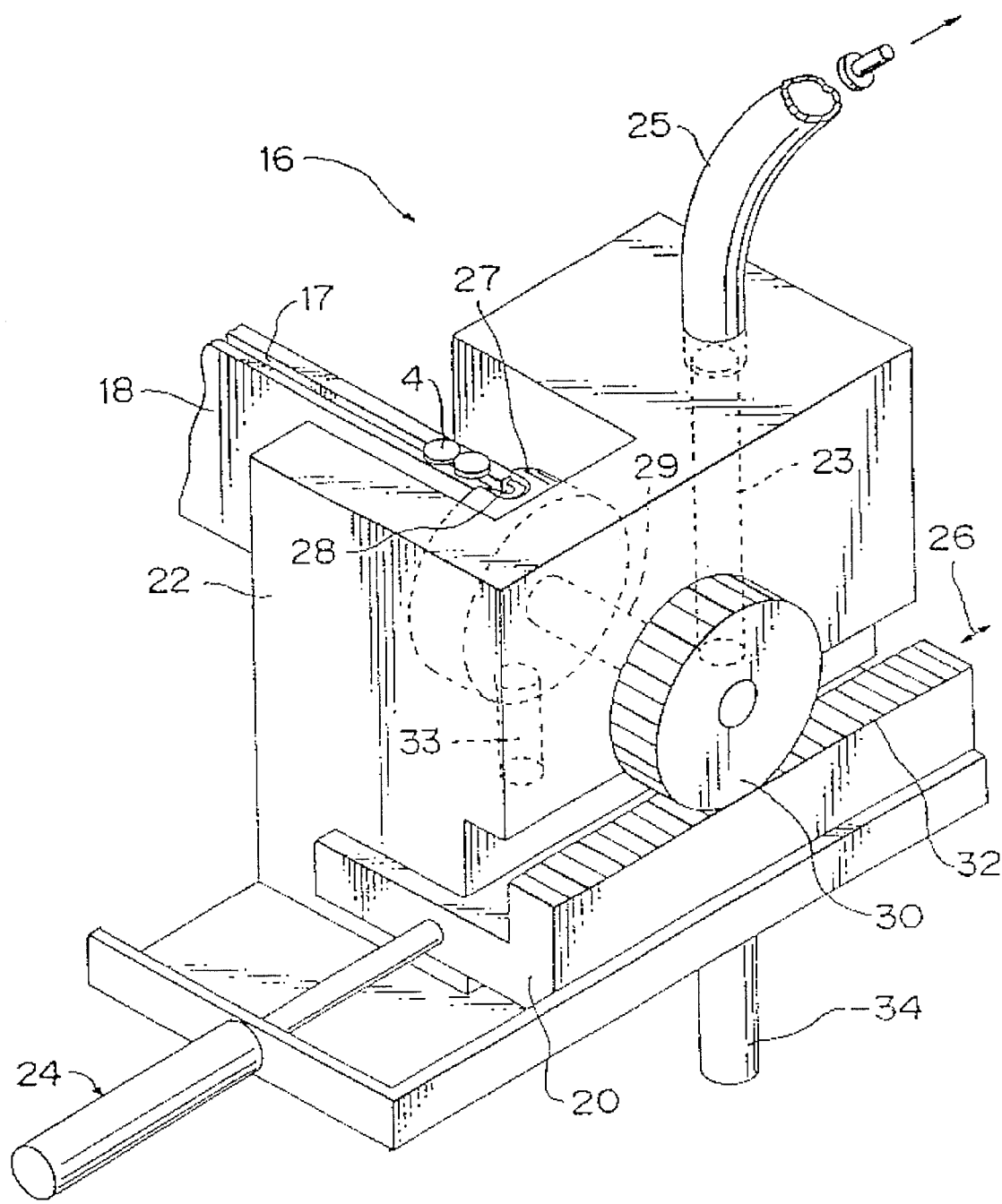
FIG. 4 is a perspective view of a separator/feeder according to the present invention.
Figure 5:
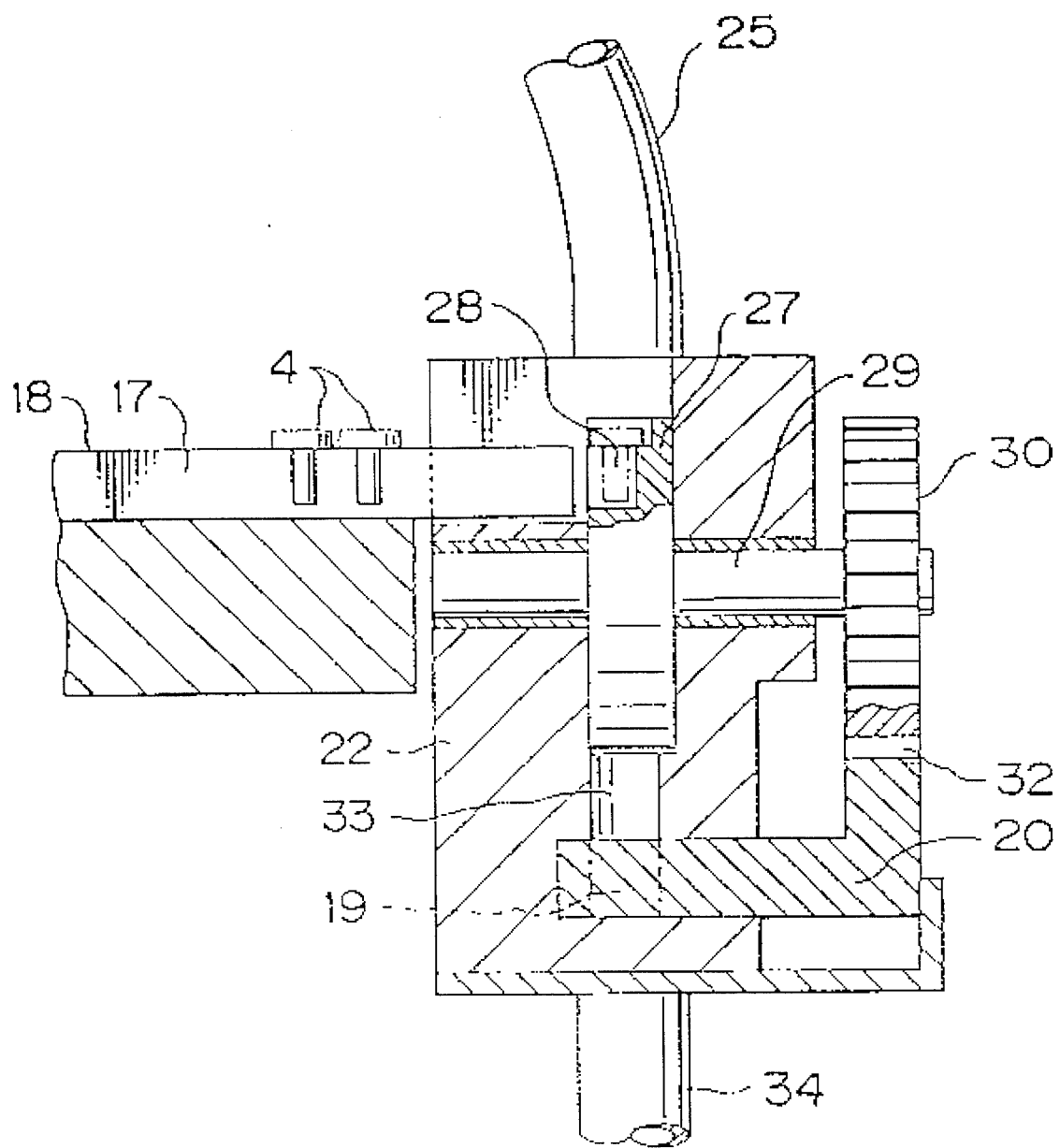
FIG. 5 is a schematic cross-sectional view showing an internal structure of the separator/feeder of FIG. 4.

The present invention will be described further by way of an embodiment shown in FIGS. 4 through 7. Like the known separator/feeder 1 (FIGS. 1–3), a separator/feeder 16 according to the present invention uses a chute 18 to receive a plurality of T-studs 4 as headed fasteners arranged in a line with their shanks received in a groove 16 and their heads being above the groove so as to be moved toward an outlet; a shuttle 20 having a storage cavity 19 (FIGS. 6 and 7) to store a single T-stud 4; a body or housing 22 to reciprocatingly support the shuttle 20 and attached to the chute 18 to receive T-studs; a piston-cylinder device 24 attached to the body 22 to reciprocate the shuttle 20 between a first position (See FIG. 7) in which the storage cavity 19 receives a T-stud from the chute 18 and a second position (See FIG. 6) in which the storage cavity 19 is positioned at a discharge port 23 for the T-studs 4; and a discharge tube 25 attached to the discharge port 23 to feed T-studs with their shanks being foremost. The shuttle 20 is reciprocated by the piston-cylinder device 24 as indicated by an arrow 26 in FIG. 6 and moves reciprocatingly between the first position shown in FIG. 7 and the second position shown in FIG. 6.

In the separator/feeder 16 of the present invention, in addition to the above structure, the housing 22 is provided with a disk 27 which is positioned to rotate past the outlet of the chute 18 and the first position (FIG. 7) in which a T-stud is received in the storage cavity 19 of the shuttle under the chute. As illustrated, the disk 27 is formed of a circular plate with a pocket 28 on its periphery in order to receive a T-stud 4. The disk 27 is rotatably supported in the housing 22 by means of a horizontal shaft 29. The disk is rotated while it keeps a T-stud 4 received from the chute 18 in the pocket 28 and turns the T-stud 4 upside-down or opposite to that in the first position. On the opposite end of the shaft 29, a pinion 30 is mounted. The gear of the pinion 30 is in mesh with the gear of a rack 32 formed on the shuttle 20 so that the reciprocating movement of the shuttle 20 is associated with the rotation of the disk 27. By means of the gears of the pinion 30 and the rack 32, the disk 27 is rotated so that when the storage cavity 19 of the shuttle 20 is at the first position of FIG. 7, the T-stud 4 drops from the pocket 28 through a passage 33 of the housing into the storage cavity 19 for storage, and when the storage cavity 19 is in the second position of FIG. 6, a T-stud 4 from the chute 18 is received in the pocket 28.

Figure 6:
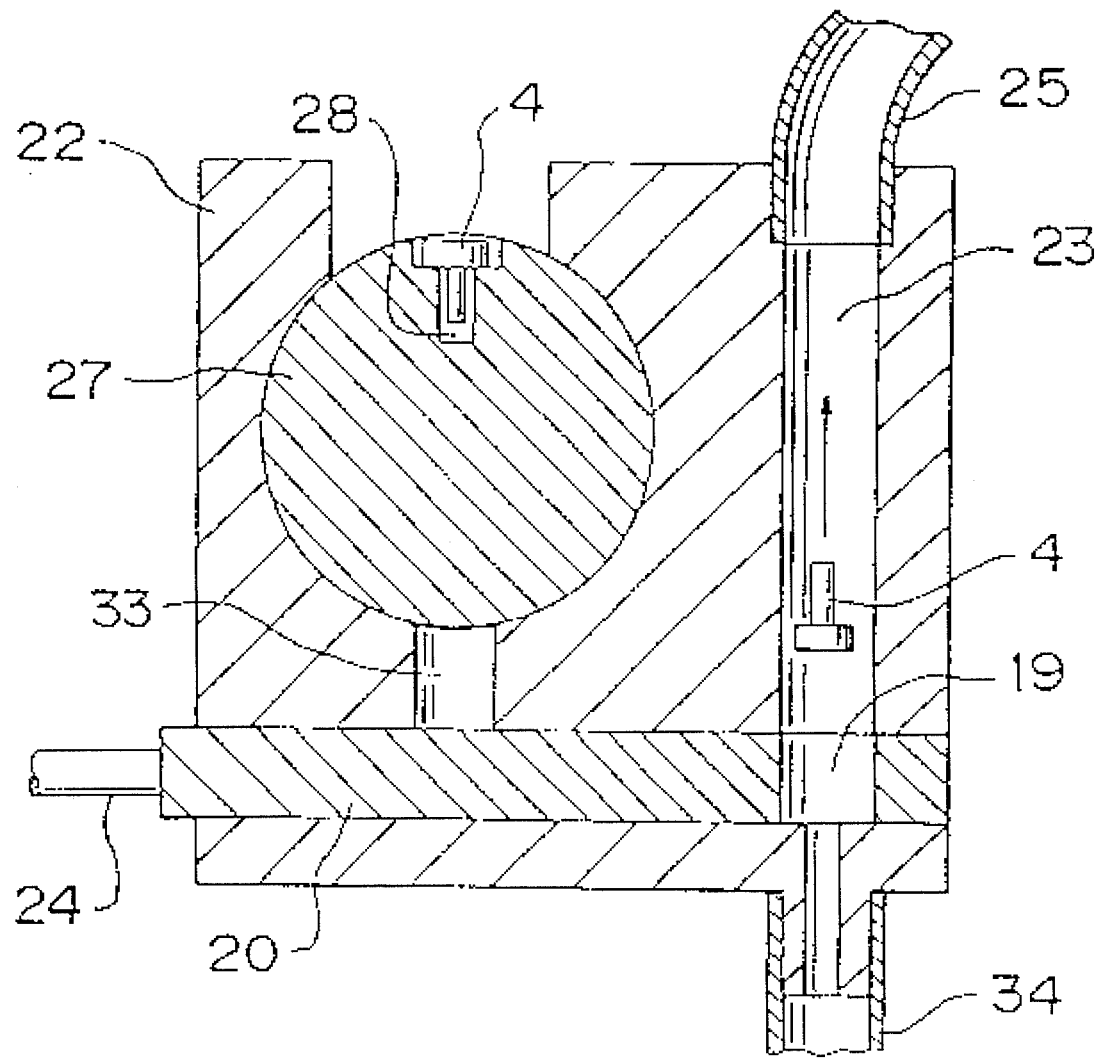
FIG. 6 is a schematic cross-sectional view of a T-stud received by a disk while a shuttle is at the second position in the separator/feeder according to the present invention.
Figure 7:
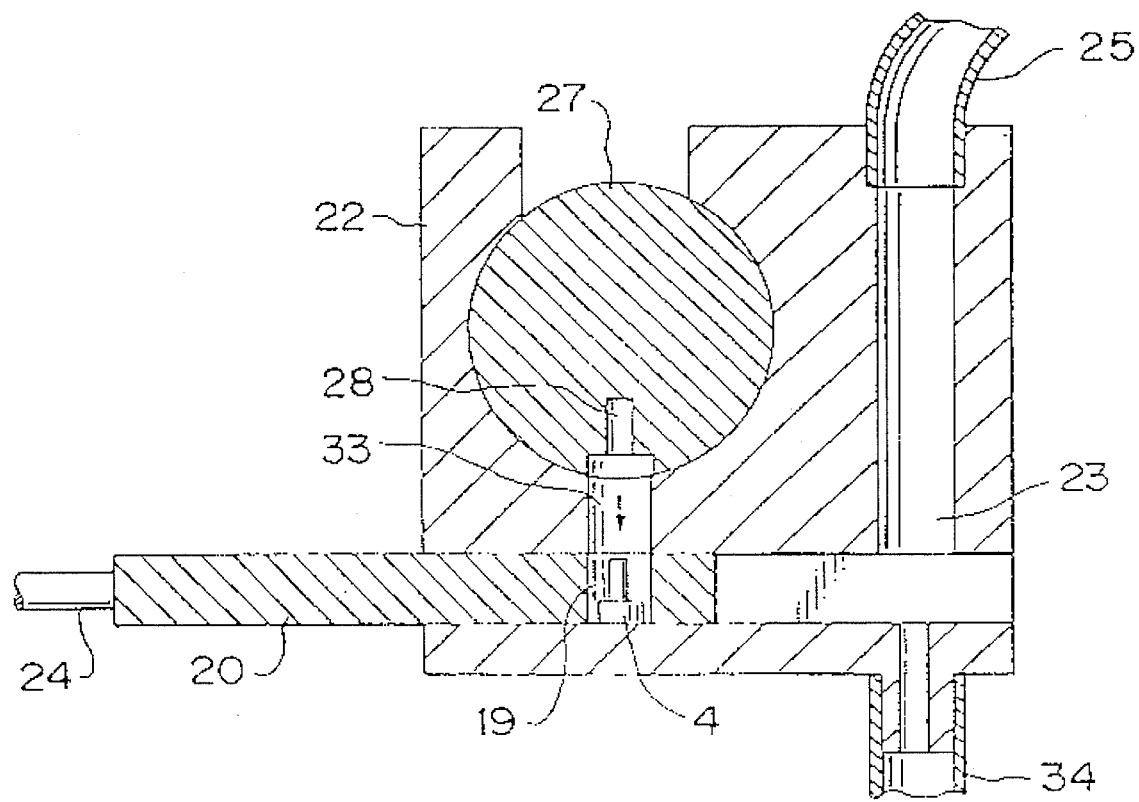
FIG. 7 is a schematic cross-sectional view of the shuttle at the first position so that a T-stud is received by the shuttle from the disk in the separator/feeder according to the present invention.

In operation the separator/feeder 16 according to the invention receives a single T-stud 4 in the pocket 28 of the disk 27 at the second position of FIG. 6. Next, the shuttle 20 is moved to the first position of FIG. 7 by the piston-cylinder device 24, and the pinion 30 which is in engagement with the rack 32 of the shuttle 20, rotates the disk 27 through 180 degrees as shown in FIG. 7. With this rotation, the T-stud 4 is turned over and thus passes through the passage 33 of the body to be stored in the storage cavity 19. Thereafter, the shuttle 20 is moved again to the second position of FIG. 6 by the piston-cylinder device 24 and the T-stud 4 is transferred to the discharge port 23 for discharge purposes. At the same time, the disk 27 is rotated through 180 degrees by the rack 32 and the pinion 30 so that the pocket 28 receives the next T-stud 4. As this operation is repeated, T-studs 4 are fed to a stud welder or the like through the discharge tube 25 one by one with their shanks being foremost.

In the present invention, the discharge port 23 for the T-studs 4 conveniently faces toward the top surface of the housing 22. As the T-stud 4 is turned upside-down by the disk 27, the stud is fed to the tube 25 with an orientation such that the shank of the stud is foremost even when the studs are discharged above the housing 22. The tube 25 extends from the top surface of the body 22 to a stud welder or the like. An air pipe 34 extends from the lower portion of the discharge port 23 to supply pressurized air to the tube 25.

Figure 1:
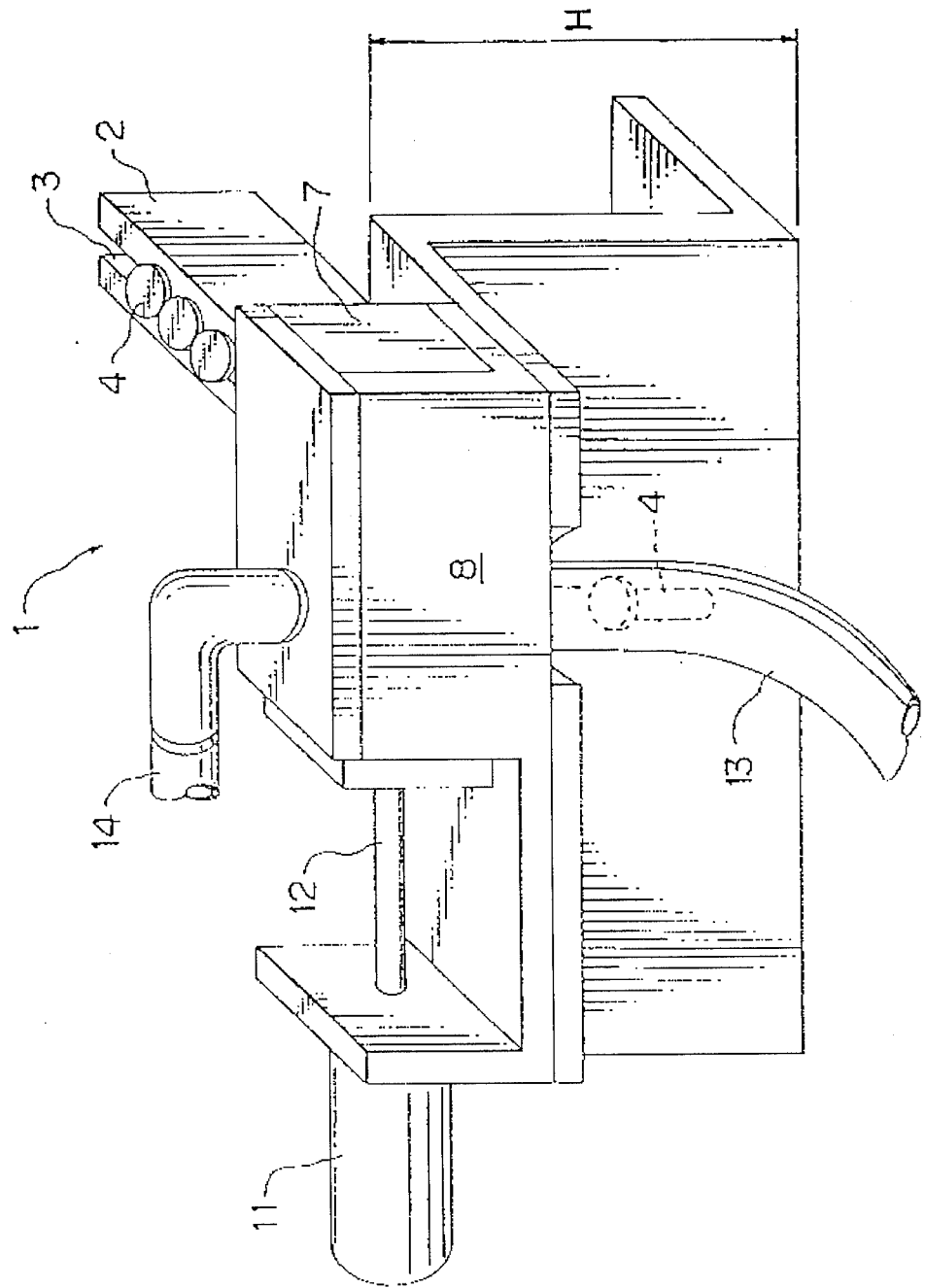
FIG. 1 is a perspective view of a conventional separator/feeder.

Since the tube 25 is allowed to extend to the top surface as mentioned above, unlike the known separator/feeder shown in FIG. 1, there is no need to provide a space of a height H below the body, as in the conventional device. Since the air pipe 34 conveys only air, it can be bent freely and only a small space is required for its disposition.

The above arrangement according to the invention allows the headed fastener discharge port of the housing to face the top surface of the housing, so that the fastener discharge tube extends into an ample space above the top surface of the housing. Thus the fastener discharge tube can be easily manipulated in any direction.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A separator/feeder housing for headed fasteners, comprising a chute supported in said housing for receiving a plurality of said headed fasteners with their shanks in line in a groove in said chute and their heads being above said groove, an outlet for said chute, a shuttle reciprocatingly supported in said housing having a storage cavity therein for receiving one of said fasteners, drive means connected to said housing for reciprocating said shuttle between a first position in said housing in which said storage cavity of said shuttle receives said one fastener from said chute and a second position in which said storage cavity is positioned at a discharge port, a discharge tube connected to said discharge port for conveying said headed fasteners with their shanks being in a foremost position, a rotatable disc supported in said housing and connected to said drive means, said disc having a pocket formed on the periphery thereof for receiving said one fastener in a first orientation from said outlet of said chute and thereby depositing said one fastener in a second orientation opposite to said first orientation in said storage cavity of said shuttle when said shuttle is in said first position, and said discharge port being directed to the top of said housing.

2. A separator/feeder housing according to claim 1, wherein said pocket of said disc is disposed opposite said outlet of said chute when said shuttle is in said second position.

3. A separator/feeder housing according to claim 1, wherein said drive means for reciprocating said shuttle includes auxiliary means for simultaneously rotating said disc.

\* \* \* \* \*